(12) United States Patent
Hotson et al.

(10) Patent No.: US 10,726,304 B2
(45) Date of Patent: Jul. 28, 2020

(54) REFINING SYNTHETIC DATA WITH A GENERATIVE ADVERSARIAL NETWORK USING AUXILIARY INPUTS

(71) Applicant: Ford Global Technologies, LLC, Dearborn, MI (US)

(72) Inventors: Guy Hotson, Palo Alto, CA (US); Gintaras Vincent Puskorius, Novi, MI (US); Vidya Nariyambut Murali, Sunnyvale, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 153 days.

(21) Appl. No.: 15/699,653

(22) Filed: Sep. 8, 2017

(65) Prior Publication Data
US 2019/0080206 A1    Mar. 14, 2019

(51) Int. Cl.
| G06K 9/00 | (2006.01) |
| G06K 9/62 | (2006.01) |
| G06T 11/60 | (2006.01) |
| G06T 7/11 | (2017.01) |
| G06T 7/13 | (2017.01) |

(52) U.S. Cl.
CPC ....... *G06K 9/6264* (2013.01); *G06K 9/00791* (2013.01); *G06K 9/00798* (2013.01); *G06T 7/11* (2017.01); *G06T 7/13* (2017.01); *G06T 11/60* (2013.01); *G06T 2207/10016* (2013.01); *G06T 2207/10028* (2013.01); *G06T 2207/20081* (2013.01); *G06T 2207/30256* (2013.01)

(58) Field of Classification Search
None
See application file for complete search history.

(56) References Cited

U.S. PATENT DOCUMENTS

| 7,764,293 | B2 | 7/2010 | Kakuta et al. |
| 8,224,127 | B2 | 7/2012 | Woodard |
| 9,633,282 | B2 | 4/2017 | Sharma |
| 2010/0271367 | A1 | 10/2010 | Vaden |
| 2017/0098152 | A1 | 4/2017 | Kerr |
| 2018/0275658 | A1* | 9/2018 | Iandola ............... G05D 1/0088 |
| 2018/0349526 | A1* | 12/2018 | Atsmon ............... G06N 3/0454 |
| 2019/0072978 | A1* | 3/2019 | Levi ..................... G06K 9/6274 |

OTHER PUBLICATIONS

Generative Adversarial Networks, Apr. 7, 2017.
(Continued)

*Primary Examiner* — Soo Shin
(74) *Attorney, Agent, or Firm* — David R. Stevens; Stevens Law Group

(57) ABSTRACT

The present invention extends to methods, systems, and computer program products for refining synthetic data with a Generative Adversarial Network (GAN) using auxiliary inputs. Refined synthetic data can be rendered more realistically than the original synthetic data. Refined synthetic data also retains annotation metadata and labeling metadata used for training of machine learning models. GANs can be extended to use auxiliary channels as inputs to a refiner network to provide hints about increasing the realism of synthetic data. Refinement of synthetic data enhances the use of synthetic data for additional applications.

20 Claims, 4 Drawing Sheets

(56) References Cited

OTHER PUBLICATIONS

Reed, Scott, et al. Generative Adversarial Text to Image Synthesis (2016).
Isola, Phillip, et al. "Image-to-image translation with conditional adversarial networks." arXiv preprint arXiv:1611.07004 (2016).
Shrivastava, Ashish, et al. "Learning from Simulated and Unsupervised images through Adversarial Training." arXiv preprint arXiv:1612.07828 (2016).

* cited by examiner

300

```
ACCESSING SYNTHETIC IMAGE DATA REPRESENTING AN IMAGE OF
A ROADWAY SCENE, THE SYNTHETIC IMAGE DATA INCLUDING
ANNOTATIONS, THE ANNOTATIONS ANNOTATING THE SYNTHETIC
IMAGE DATA WITH GROUND TRUTH DATA FOR THE ROADWAY SCENE
301
```
↓
```
ACCESSING ONE OR MORE AUXILIARY DATA STREAMS FOR THE IMAGE
302
```
↓
```
USING CONTENTS OF THE ONE OR MORE AUXILIARY DATA STREAMS
AS HINTS TO REFINE THE SYNTHETIC IMAGE DATA, REFINING THE
SYNTHETIC IMAGE DATA IMPROVING REALISM OF THE IMAGE
WITHOUT ALTERING THE ANNOTATIONS
303
```
↓
```
OUTPUTTING THE REFINED SYNTHETIC IMAGE DATA, THE REFINED
SYNTHETIC IMAGE DATA REPRESENTING A REFINED IMAGE OF THE
ROADWAY SCENE
304
```

FIG. 3

REFINING SYNTHETIC DATA WITH A GENERATIVE ADVERSARIAL NETWORK USING AUXILIARY INPUTS

CROSS-REFERENCE TO RELATED APPLICATIONS

Not applicable.

BACKGROUND

1. Field of the Invention

This invention relates generally to the field of formulating realistic training data for training machine learning models, and, more particularly, to refining synthetic data with a generative adversarial network using auxiliary inputs.

2. Related Art

The process of annotating and labeling relevant portions of image training data (e.g., still images or video) for training machine learning models can be tedious, time-consuming, and expensive. To reduce these annotating and labeling burdens, synthetic data (e.g., virtual images generated by gaming or other graphical engines) can be used. Annotating synthetic data is more straightforward as annotation is a direct by-product of generating the synthetic data.

BRIEF DESCRIPTION OF THE DRAWINGS

The specific features, aspects and advantages of the present invention will become better understood with regard to the following description and accompanying drawings where:

FIG. 3 illustrates a flow chart of an example method for refining synthetic data with a generative adversarial network using auxiliary inputs.

DETAILED DESCRIPTION

Figure 1:
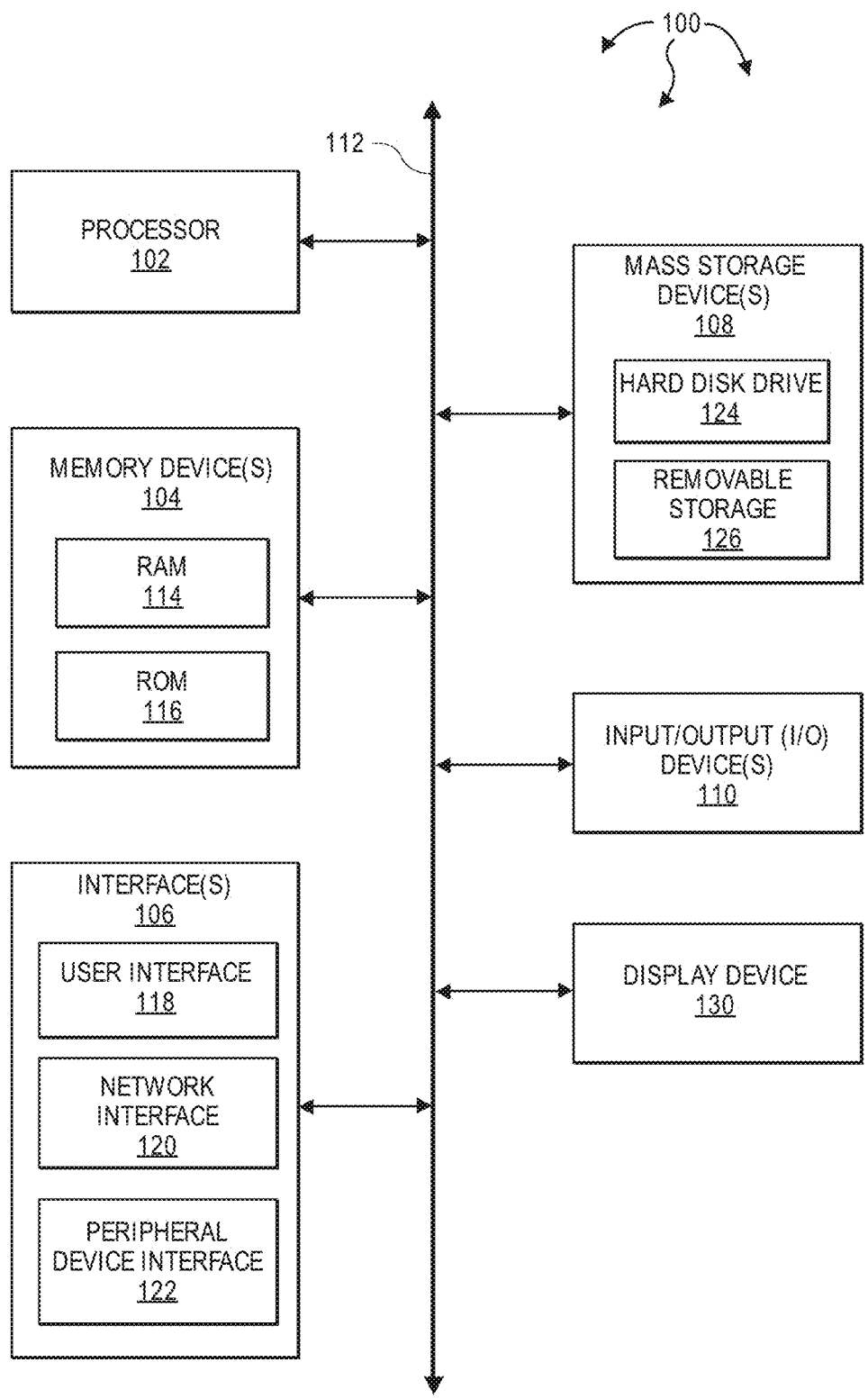
FIG. 1 illustrates an example block diagram of a computing device.

The present invention extends to methods, systems, and computer program products for refining synthetic data with a Generative Adversarial Network using auxiliary inputs.

Aspects of the invention include using Generative Adversarial Networks ("GANs") to refine synthetic data. Refined synthetic data can be rendered more realistically than the original synthetic data. Refined synthetic data also retains annotation metadata and labeling metadata used for training of machine learning models. GANs can be extended to use auxiliary channels as inputs to a refiner network to provide hints about increasing the realism of synthetic data. Refinement of synthetic data enhances the use of synthetic data for additional applications.

In one aspect, a GAN is used to refine a synthetic (or virtual) image, for example, an image generated by a gaming engine, into a more realistic refined synthetic (or virtual) image. The more realistic refined synthetic image retains annotation metadata and labeling metadata of the synthetic image used for training of machine learning models. Auxiliary inputs are provided to a refiner network to provide hints about how the more realistic refined synthetic image is to look. Auxiliary inputs can facilitate applying correct textures to different regions of a synthetic image. Auxiliary inputs can include semantic maps (e.g., facilitating image segmentation), depth maps, edges between objects, etc. Refinement of synthetic images enhances the use of synthetic images for solving problems in computer vision, including applications related autonomous driving, such as, image segmentation, identifying drivable paths, object tracking, and object three-dimensional (3D) pose estimation.

Semantic maps, depth maps, and object edges ensure that correct textures are applied to different regions of synthetic images. For example, a semantic map can segment a synthetic image into multiple regions and identify the content of each region, such as, foliage from a tree or the side of a green building. A depth map can differentiate how each image region in a synthetic image is to appear, such as, varying levels of detail/texture based on the distance of the object from the camera. Object edges can define transitions between different objects in a synthetic image.

Accordingly, aspects of the invention include an image processing system that refines synthetic (or virtual) images to improve the appearance of the synthetic (or virtual) images and provide higher quality (e.g., more realistic) synthetic (or virtual) images for training machine learning models. When the training of a machine learning models is complete, the machine learning model can be used with autonomous vehicles and driver-assisted vehicles to accurately process and identify objects within images captured by vehicle cameras and sensors.

A Generative Adversarial Network (GAN) can use machine learning to train two networks, a discriminator network and a generator network, that essentially play a game against (i.e., are adversarial to) one another. The discriminator network is trained to differentiate between real data instances (e.g., real images) and synthetic data instances (e.g., virtual images) and classify data instances as either real or synthetic. The generator network is trained to produce synthetic data instances the discriminator network classifies as real data instances. A strategic equilibrium is reached when the discriminator network is incapable of assessing whether any data instance is synthetic or real. It may be that the generator network never directly observes real data instances. Instead, the generator network receives information about real data instances indirectly as seen through the parameters of the discriminator network.

In one aspect, a discriminator network differentiates between real images and synthetic (or virtual) images and classifies images as either real or synthetic (or virtual). In this aspect, the generator network is trained to produce synthetic (or virtual) images. A GAN can be extended to include a refiner network (which may or may not replace the generator network). The refiner network observes a synthetic (or virtual) image and generates a variation of the synthetic (or virtual) image. The variation of the synthetic (or virtual) image is intended to exhibit characteristics having increased similarity to real images, while retaining annotation metadata and labeling metadata. The refiner network attempts to refine synthetic (or virtual) images so that the discriminator network classifies refined synthetic (or virtual) images as real images. The refiner network also attempts to maintain similarities (e.g., regularize characteristics) between an input synthetic (or virtual) image and a refined synthetic (or virtual) image.

The refiner network can be extended to receive additional information, which can be generated as part of a synthesis process. For example, the refiner network can receive one or more of: semantic maps (e.g., facilitating image segmentation), depth maps, edges between objects, etc. In one aspect, the refiner network receives an auxiliary image that encodes a pixel level sematic segmentation of the synthetic (or virtual) image as input. In another aspect, the refiner network receives an auxiliary image that encodes a depth map of the contents of the synthetic (or virtual) image as input. In a further aspect, the refiner network can receive an auxiliary image that encodes edges between objects in the synthetic (or virtual) image.

For example, a synthetic (or virtual) image may include foliage from a tree. The semantic segmentation can indicate that the part of the synthetic (or virtual) image including the foliage is in fact foliage (and not for example, the side of a green building). A depth map can be used to differentiate how the foliage is to appear as a function of distance from the camera. The edges can be used to differentiate between different objects in the synthetic (or virtual) image.

Auxiliary data can be extracted from a dataset of real images used during training of the discriminator network. Extracting auxiliary data from a data set of real images can include using sensors, such as, LIDAR, that are synchronized with a camera data stream. For auxiliary data representing semantic segmentation, segmentation can be performed either by hand or by a semantic segmentation model. The GAN can then be formulated as a conditional GAN, where the discriminator network is conditioned on the supplied auxiliary data.

Accordingly, a GAN can leverage auxiliary data streams such as semantic maps and depth maps to help ensure correct textures are correctly applied to different regions of a synthetic (or virtual) image. The GAN can generate refined synthetic (or virtual) images having increased realism while retaining annotations and/or labels for use in training additional models (e.g., computer vision, autonomous driving, etc.).

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
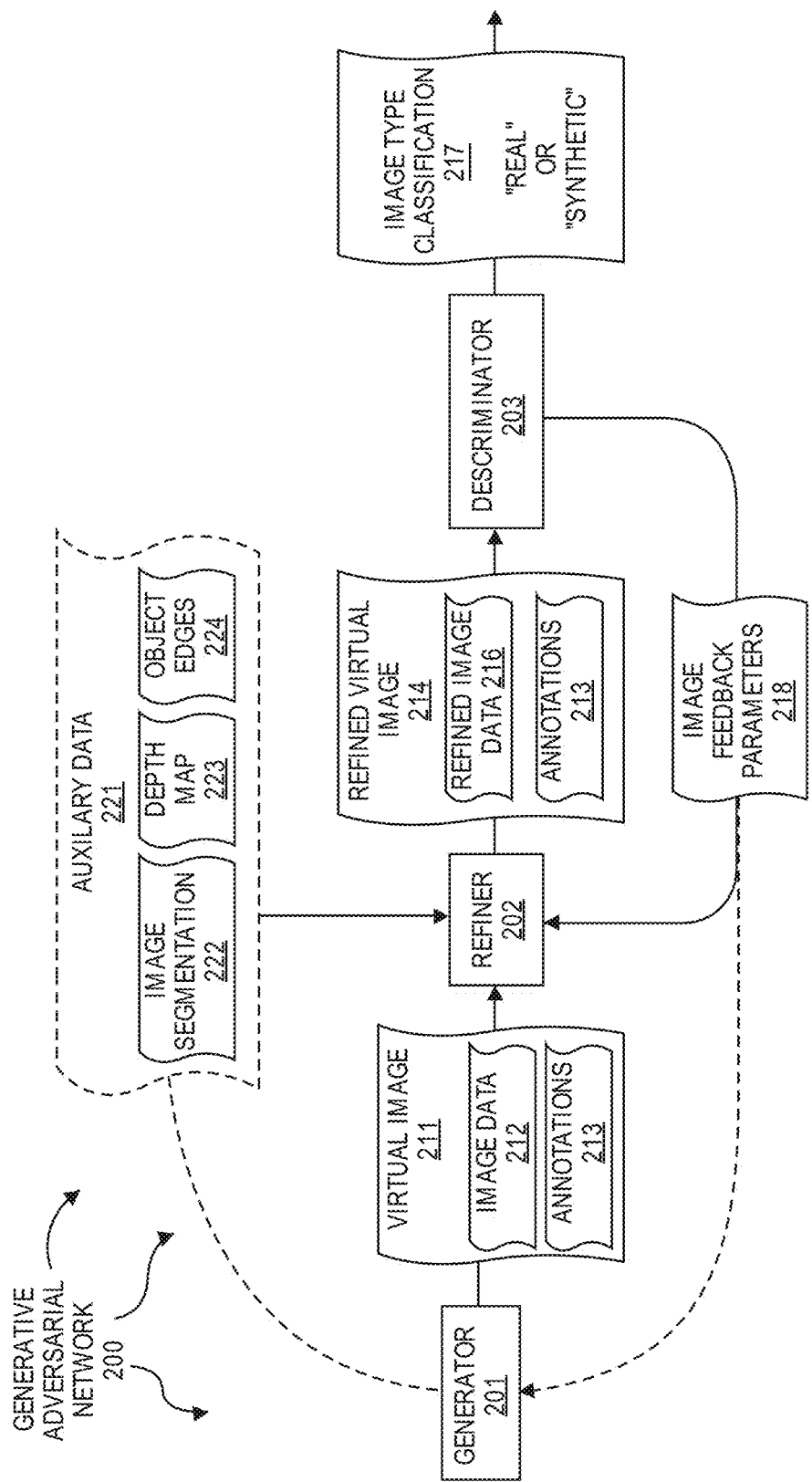
FIG. 2 illustrates an example generative adversarial network that facilitates refining synthetic data using auxiliary inputs.

FIG. 2 illustrates an example generative adversarial network (GAN) 200 that facilitates refining synthetic data using auxiliary inputs. Generative adversarial network (GAN) 200 can be implemented using components of computing device 100.

As depicted, GAN 200, includes generator 201, refiner 202, and discriminator 203. Generator 201 can generate and output virtual images including synthetic image data and annotations. The synthetic image data can represent an image of a roadway scene. The annotations annotate the synthetic image data with ground truth data for the roadway scene. The annotations can be a by-product of generating the synthetic image data. In one aspect, generator 201 is a gaming engine.

However, synthetic image data can lack sufficient realism, especially for higher resolution images and/or for images containing more complex objects. A human observer can typically differentiate a real image from a virtual image generated by a gaming engine.

As such, refiner 202 can access virtual images and refine virtual images to improve realism. Refiner 202 can receive a virtual image from generator 201. Refiner 202 can access auxiliary data, such as, for example, image segmentation, a depth map, object edges, etc. Refiner 202 can refine (transform) a virtual image into a refined virtual image based on the auxiliary data. For example, refiner 202 can use the content of auxiliary data as hints to improve the realism of the virtual image without altering annotations. Refiner 202 can output refined virtual images.

Discriminator 203 can receive a refined virtual image from refiner 202. Discriminator 203 can classify a refined virtual image as "real" or "synthetic". When an image is classified as "real", discriminator 203 can make the refined virtual image available for use in training other neural networks. For example, discriminator 203 can make refined virtual images classified as "real" available for training computer vision neural networks, including those related to autonomous driving.

When an image is classified as "synthetic", discriminator 203 can generate feedback parameters for further improving the realism of the refined virtual image. Discriminator 203 can send the feedback parameters to refiner 202 and/or to generator 201. Refiner 202 and/or generator 201 can use the feedback parameters to further improve the realism of previously refined virtual images (possibly with further reference to auxiliary data). Further refined virtual images can be sent to discriminator 203. A virtual image can be further refined (transformed) based on auxiliary data and/or feedback parameters until discriminator 203 classifies the virtual image as "real" (or until no further improvements to realism are possible, after performing a specified number of refinements, etc.).

FIG. 3 illustrates a flow chart of an example method for 300 refining synthetic data with GAN 200 using auxiliary inputs. Method 300 will be described with respect to the components and data of GAN 200.

Generator 201 can generate virtual image 211 representing an image of a roadway scene (e.g., an image of a road, an image of a highway, an image of an interstate, an image of a parking lot, an image of an intersection, etc.). Virtual image 211 includes synthetic image data 212 and annotations 213. Synthetic image data 212 can include pixel values for pixels in virtual image 211. Annotations 213 annotate the synthetic image data with ground truth data for the roadway scene. Generator 201 can output virtual image 211.

Method 300 includes accessing synthetic image data representing an image of a roadway scene, the synthetic image data including annotations, the annotations annotating the synthetic image data with ground truth data for the roadway scene (301). For example, refiner 202 can access virtual image 211, including synthetic image data 212 and annotations 213, for a scene that may be encountered during driving (e.g., intersection, road, parking lot, etc.). Method 300 includes accessing one or more auxiliary data streams for the image (302). For example, refiner 202 can access one or more of: image segmentation 222, depth map 223, and object edges 224 from auxiliary data 221.

Image segmentation 222 can segment virtual image 211 into multiple regions and identify the content of each region, such as, foliage from a tree or the side of a green building. Depth map 223 can differentiate how each image region in virtual image 211 is to appear, such as, varying levels of detail/texture based on the distance of the object from the camera. Object edges 224 can define transitions between different objects in virtual image 211.

Method 300 includes using contents of the one or more auxiliary data streams as hints to refine the synthetic image data, refining the synthetic image data improving realism of the image without altering the annotations (303). For example, refiner 202 can use the contents of one or more of: image segmentation 222, depth map 223, and object edges 224 as hints to refine (transform) virtual image 211 into refined synthetic image data 212. Refiner 202 can refine synthetic image data 211 into refined synthetic image data 212 without altering annotations 213. Refined synthetic image data 212 can improve the realism of the scene relative to synthetic image data 211.

In one aspect, image segmentation 222 is included in an auxiliary image that encodes a pixel level sematic segmentation of virtual image 211. In another aspect, depth map 223 is included in another auxiliary image that encodes a depth map of the contents virtual image 211. In a further aspect, objects edges 224 is included in a further auxiliary image that encodes edges between objects in virtual image 211. Thus, refiner 202 can use one or more auxiliary images to refine synthetic image data 211 into refined synthetic image data 212

In one aspect, generator 201 generates auxiliary data 221 as a by-product of generating virtual image 211. In another aspect, auxiliary data 221 is extracted from a dataset of real images used to train discriminator 203.

Method 300 includes outputting the refined synthetic image data, the refined synthetic image data representing a refined image of the roadway scene (304). For example, refiner 202 can output refined virtual image 214 for the scene that may be encountered during driving. Refined virtual image 214 includes refined synthetic image data 216 and annotations 213.

Discriminator 203 can access refined virtual image 214. Discriminator 203 can use refined synthetic image data 216 and annotations 213 to make image type classification 217 for refined virtual image 214. Image type classification 217 classifies refined virtual image 214 as "real" or "synthetic". If discriminator 203 classifies refined virtual image 214 as "real", discriminator 203 can make refined virtual image 214 available for use in training other neural networks, such as, computer vision neural networks, including those related to autonomous driving.

On the other hand, if discriminator 203 classifies refined virtual image 214 as "synthetic", discriminator 203 can generate image feedback parameters 218 for further improving the realism of refined virtual image 214. Discriminator 203 can send image feedback parameters 218 to refiner 202 and/or to generator 201. Refiner 202 and/or generator 201 can use image feedback parameters 218 to further improve the realism of refined virtual image 214 (possibly with further reference to auxiliary data 221). Further refined virtual images can be sent to discriminator 203. Refiner 202 and/or generator 201 can further refine (transform) refined virtual image 214 based on auxiliary data 221 and/or image feedback parameters 218 (or additional other feedback parameters). Image refinement can continue until discriminator 203 classifies a further refined virtual image (further refined from refined virtual image 214) as "real" (or until no further improvements to realism are possible, after performing a specified number of refinements, etc.)

Figure 4:
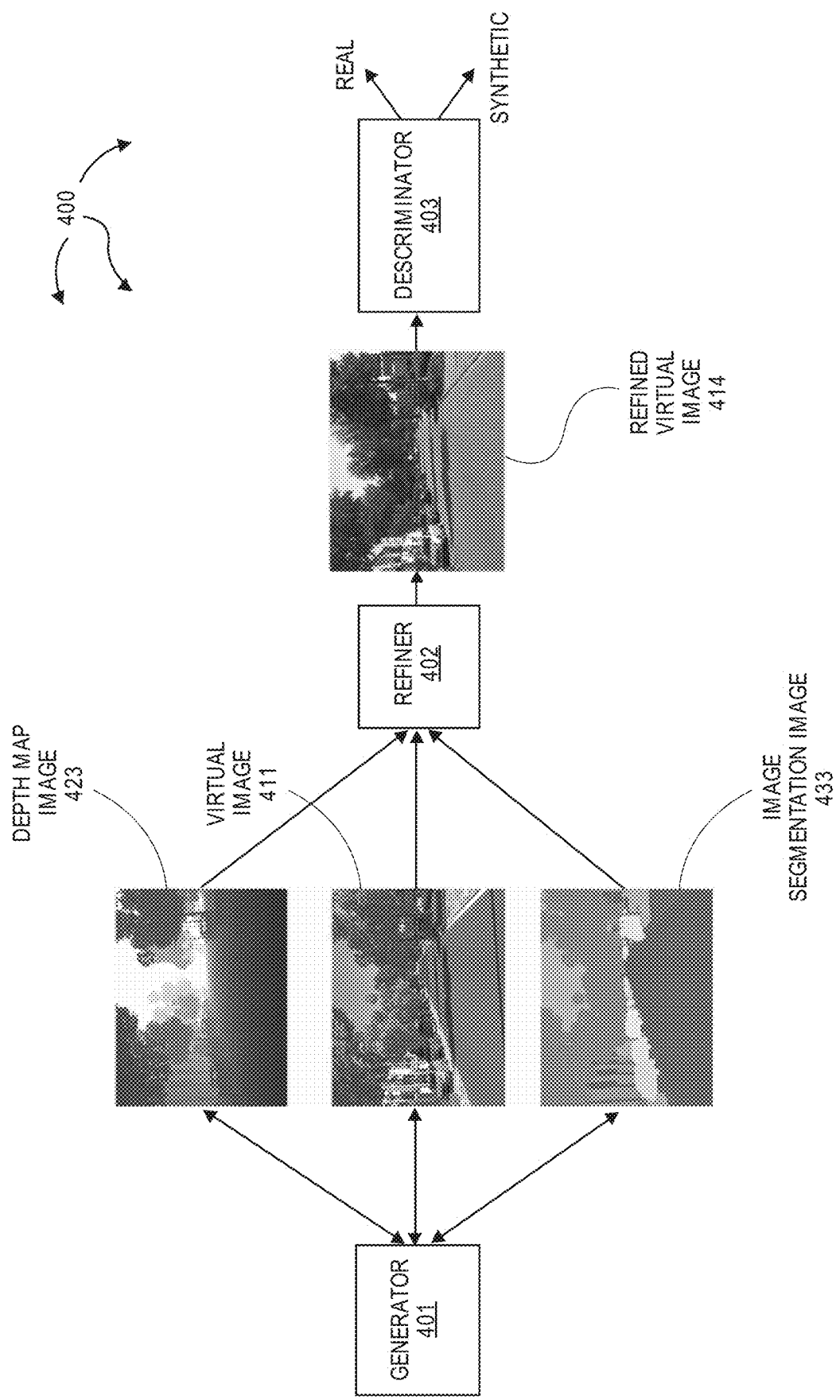
FIG. 4 illustrates an example data flow for refining synthetic data with a generative adversarial network using auxiliary inputs.

FIG. 4 illustrates an example data flow 400 for refining synthetic data with a generative adversarial network using auxiliary inputs. Generator 401 generates virtual image 411, image segmentation image 433, and depth map image 423. Refiner 402 uses the contents of image segmentation image 433 and depth map image 423 (e.g., as hints) to refine (transform) virtual image 411 into refined virtual image 414. The realism of refined virtual image 414 can be improved relative to virtual image 411. Discriminator 403 classifies refined virtual image 414 as "real" or "synthetic"

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, virtual images, synthetic image data, annotations, auxiliary data, auxiliary images, image segmentation, depth maps, object edges, refined virtual images, refined synthetic data, image type classifications, image feedback parameters, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, virtual images, synthetic image data, annotations, auxiliary data, auxiliary images, image segmentation, depth maps, object edges, refined virtual images, refined synthetic data, image type classifications, image feedback parameters, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed:

1. A method comprising:
accessing synthetic image data representing an image of a roadway scene and including ground truth data annotations;
accessing auxiliary data including image segmentation data, depth map data, and object edge data, the image segmentation data segmenting the synthetic image into multiple regions and indicating an object in each of the multiple regions, the depth map differentiating how each of the multiple regions is to appear based on object distance from a camera, the object edge data defining transitions between a plurality of objects in the synthetic image data;
generating refined synthetic image data using the image segmentation data, the depth map data, and the object edge data, as hints, including refining the synthetic image data by applying textures to the synthetic image data considering the transitions between different objects, from among the plurality of objects, in different regions, from among the multiple regions, have different object distances from the camera and without altering the ground truth data annotations; and
outputting the refined synthetic image data.

2. The method of claim 1, wherein accessing the auxiliary data comprises accessing one or more auxiliary data streams corresponding to the image of the roadway scene.

3. The method of claim 2, wherein accessing the auxiliary data comprises accessing a pixel level semantic segmentation of the image of the roadway scene.

4. The method of claim 2, wherein accessing the synthetic image data comprises accessing pixel values for pixels in the image of the roadway scene.

5. The method of claim 1, wherein accessing the auxiliary data comprises accessing a depth map image and an image segmentation image.

6. The method of claim 1, wherein accessing the auxiliary data including the image segmentation data comprises accessing image segmentation data indicating one of foliage or a side of a building in a region.

7. A method for refining machine learning model training data, the method comprising:
accessing synthetic image data representing an image of a roadway scene and including annotations annotating the synthetic image data with ground truth data for the roadway scene;
accessing one or more auxiliary data streams corresponding to the image including image segmentation data, depth map data, and object edge data, the image segmentation data segmenting the synthetic image into multiple regions and indicating an object in each of the multiple regions, the depth map differentiating how each of the multiple regions is to appear based on object distance from a camera, the object edge data defining transitions between a plurality of objects in the synthetic image data;
refining the synthetic image data using contents of the image segmentation data, the depth map data, and the object edge data, as hints, including applying correct textures to the synthetic image data considering transitions between different objects, from among the plurality of objects, in different regions, from among the multiple regions, have different object distances from the camera and without altering the annotations; and
outputting the refined synthetic image data representing a refined image of the roadway scene.

8. The method of claim 7, wherein accessing the synthetic image data representing the image of a roadway scene comprises accessing previously refined synthetic image data representing the image of the roadway scene;
further comprising receiving one or more feedback parameters associated with a discriminator decision classifying the previously refined synthetic data; and
wherein refining the synthetic image data comprises using the one or more feedback parameters to further refine the previously refined synthetic image data without altering the annotations.

9. The method of claim 7, wherein accessing the one or more auxiliary data streams corresponding to the image of the roadway scene comprises accessing a pixel level semantic segmentation of the image of the roadway scene.

10. The method of claim 7, wherein accessing the one or more auxiliary data streams corresponding to the image of the roadway scene comprises accessing the depth map data that defines varying levels of detail for objects based on distance of the objects from a camera.

11. The method of claim 7, wherein accessing the synthetic image data comprises accessing pixel values for pixels in the image of the roadway scene.

12. The method of claim 7, further comprising extracting an auxiliary data stream from other image data.

13. The method of claim 12, wherein extracting the auxiliary data stream from the other image data comprises extracting the auxiliary data stream from a sensor that is synchronized with a camera data stream.

14. The method of claim 7, further comprising using the refined synthetic image data to train a machine learning module associated with autonomous driving of a vehicle.

15. The method of claim 7, wherein accessing the one or more auxiliary data streams comprises accessing image segmentation data indicating one of foliage or a side of a building in a region.

16. A computer system comprising:
system memory storing instructions; and
one or more processors executing the instructions stored in the system memory to perform the following:

access synthetic image data representing an image of a roadway scene and including annotations annotating the synthetic image data with ground truth data for the roadway scene;

access auxiliary data streams corresponding to the image including image segmentation data, depth map data, and object edge data, the image segmentation data segmenting the synthetic image into multiple regions and indicating an object in each of the multiple regions, the depth map differentiating how each of the multiple regions is to appear based on object distance from a camera, the object edge data defining transitions between different objects in the synthetic image data;

refine the synthetic image data use contents of the image segmentation data, the depth map data, and the object edge data, as hints, including applying textures to the synthetic image data considering transitions between different objects in different regions, from among the multiple regions, have different object distances from the camera and without altering the annotations; and output the refined synthetic image data.

17. The computer system of claim 16, wherein the instructions configured to access the synthetic image data representing the image of the roadway scene comprise instructions configured to access previously refined synthetic image data representing the image of the roadway scene;

further comprising instructions configured to receive feedback parameters associated with a discriminator decision classifying the previously refined synthetic data; and wherein the instructions configured to refine the synthetic image data comprise instructions configured to use the feedback parameters to further refine the previously refined synthetic image data without altering the annotations.

18. The computer system of claim 16, further comprising instructions configured to extract an auxiliary data stream, from among the auxiliary data streams, from a sensor that is synchronized with a camera data stream.

19. The computer system of claim 16, further comprising instructions configured to use the refined synthetic image data to train a machine learning module associated with autonomous driving of a vehicle.

20. The computer system of claim 16, wherein the instructions configured to access the auxiliary data streams comprise instructions configured to access image segmentation data indicating one of foliage or a side of a building in a region.

* * * * *